US006539274B1

(12) United States Patent
Rauth et al.

(10) Patent No.: US 6,539,274 B1
(45) Date of Patent: Mar. 25, 2003

(54) METHOD FOR COMPENSATING FOR TEMPERATURE-RELATED DIMENSIONAL DEVIATIONS IN MACHINE GEOMETRY

(75) Inventors: Michael Rauth, Traunreut (DE); Johann Zacek, Evenhausen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 09/427,946

(22) Filed: Oct. 22, 1999

(30) Foreign Application Priority Data

Oct. 22, 1998 (DE) .......................... 198 48 642

(51) Int. Cl.[7] ............................................. G06F 19/00
(52) U.S. Cl. ..................... 700/159; 700/193; 409/238
(58) Field of Search ........................ 700/159, 193, 700/175–176, 189; 409/238, 239

(56) References Cited

U.S. PATENT DOCUMENTS

| | | | | |
|---|---|---|---|---|
| 4,471,443 A | * | 9/1984 | Kinoshita et al. ............ 700/193 |
| 4,808,048 A | * | 2/1989 | Miller .......................... 409/239 |
| 5,375,066 A | * | 12/1994 | Yee et al. ..................... 700/193 |
| 5,408,758 A | | 4/1995 | Mizutani et al. ............... 33/702 |
| 5,444,640 A | * | 8/1995 | Hirai ........................... 700/193 |
| 5,477,118 A | * | 12/1995 | Yoneda et al. ............... 318/569 |
| 5,523,953 A | | 6/1996 | Araie et al. .................. 700/193 |
| 5,619,414 A | * | 4/1997 | Ishii ............................ 700/175 |
| 5,740,081 A | * | 4/1998 | Suzuki ......................... 702/94 |
| 5,779,405 A | * | 7/1998 | Aiso et al. ................... 409/132 |
| 5,795,112 A | * | 8/1998 | Senda .......................... 409/132 |
| 5,895,181 A | * | 4/1999 | Ito et al. ...................... 409/132 |
| 5,903,459 A | * | 5/1999 | Greenwood et al. ......... 700/110 |
| 5,920,483 A | * | 7/1999 | Greenwood et al. ......... 409/132 |
| 6,019,506 A | * | 2/2000 | Senda .......................... 374/55 |
| 6,044,569 A | * | 4/2000 | Ogihara et al. ............... 33/503 |

FOREIGN PATENT DOCUMENTS

| | | |
|---|---|---|
| DE | 3151750 A1 | 7/1982 |
| DE | 3633573 C1 | 2/1988 |
| DE | 42 03 994 A1 | 8/1993 |
| DE | 40 28 006 C2 | 5/1994 |
| DE | 196 38 607 A1 | 5/1997 |
| EP | 0 625 739 | 11/1994 |
| EP | 0 641 624 | 3/1995 |
| WO | 97/43703 | 11/1997 |
| WO | WO 97/46925 | 12/1997 |

OTHER PUBLICATIONS

Linnenbuerger u.a.: Rechnerische Korrektur von Fehlern bei mehrachsigen Fraesmaschinen TR, Heft 36, 1993, S. 54–57. Heidenhain Technisches Handbuch TNC 426 CB/PB TNC 430, S. 4–29 bis 4–38.

* cited by examiner

*Primary Examiner*—Leo Picard
*Assistant Examiner*—Zoila Cabrera
(74) *Attorney, Agent, or Firm*—Kenyon & Kenyon

(57) ABSTRACT

A method for reducing computational expenditure required to compensate for temperature-related dimensional deviations in a machine tool is described. Temperature-related dimensional deviations are compensated for before the user input information existing in the workpiece-specific coordinate system is converted into the machine-specific coordinate system. As a result, the requisite coordinate transformation carried out with the aid of a mapping matrix does not have to be performed twice, once for user input information and again for compensation values. In addition, the compensation values for the temperature-dependent expansion are only calculated when a minimum value for the temperature variation is exceeded.

7 Claims, 2 Drawing Sheets

METHOD FOR COMPENSATING FOR TEMPERATURE-RELATED DIMENSIONAL DEVIATIONS IN MACHINE GEOMETRY

The present invention relates to a method for compensating for temperature-dependent deviations in the dimensions of a machine in the kinematic description of the machine. More specifically, the invention relates to compensating for temperature dependent deviations in the dimensions of a machine tool or robot.

DESCRIPTION OF RELATED ART

It is known by experts skilled in the art to use appropriate compensation measures to compensate for temperature-dependent dimensional deviations in machine-tool components, which adversely affect the accuracy of the machine tool.

It is known, for example, from the German Patent 36 33 573 C1 to use two independent measuring systems, aligned in parallel, to compensate for a temperature-dependent expansion of the machine components. For example, in the case of a temperature-dependent expansion of the main spindle axis, the differences in lengths due to temperature are determined using both of the measuring units disposed in parallel to the main spindle axis. Given known temperature expansion coefficients of the two measuring systems and of the work spindles, as well as a known temperature, the system for controlling the work-spindle position can then calculate the total resulting temperature-dependent expansion, and can also compensate for it.

One disadvantage of this system is apparent when working with a five-axis workpiece machining, that includes two additional rotary axes. In this case, the thermally produced linear deformations of the machine components have effects in different directions of a three-dimensional Cartesian coordinate system, depending on the positions of the two rotary axes. In addition, this system has the drawback that a temperature compensation must be recalculated at each interpolation point on the path line along which the tool is guided.

It is known from the German Patent 31 51 750 A1 to compensate for thermal shifts experienced by a spindle. For this, the absolute value of the thermally produced displacement of the spindle is stored at a specific instant in time in a memory device, following start-up of operations. If the intention is to position the spindle, the absolute value recommended for the spindle feed rate is compensated using the absolute value stored for the thermally produced displacement, and the spindle is positioned on the basis of the thus compensated control data. The disadvantage of this procedure is that it is not suited for a high-speed five-axis machining, since it is necessary to recalculate the thermal displacement for each individual interpolation point along a path line of the machine.

A method for improving the accuracy of a machine is known from Patent WO 97/46925. A laser interferometer or a comparable three-dimensional measuring system is used to determine the position of the spindle head. This measured position is compared to the programmed position of the spindle head. From the deviations of these two positional data, the correction values are defined and supplied to the control system to be used for precise positioning. The disadvantage of the system is that a very expensive and sensitive measuring unit is additionally needed for making precise positional determinations. Moreover, here as well as for the five-axis machining, the correction values must be taken into consideration in calculating the positions for each interpolation point of a path line to be executed.

An automatic thermal-expansion compensating device is also known from the German Patent 42 03 994 A1. Correction values are determined in this system as a function of the signals from a plurality of temperature sensors, and are fed to the positioning drive. One of the temperature sensors is mounted on an interchangeable tool head, and supplies signals for compensating for tool head expansion. If no output signal from this temperature sensor is available, it is recognized that no tool head is coupled into the system, and no additional correction of the tool head expansion is performed. This approach to compensating for thermal effects on machine geometry also has disadvantages, since it requires calculating a temperature compensation for each individual interpolation point when working with a five-axis machining.

It is known from the technical manual on TNC 426 B and TNC 430 of Dr. Johannes Heidenhain GmbH, pp. 4–29 through 4–38, to provide swing-mounted fixtures for tools and/or workpieces to render possible a five-axis machining. When there is a rotation of this kind about at least one axis of rotation, there is also a thermal expansion along the longitudinal axis of the spindle, not only in one axial direction of a machine-specific Cartesian coordinate system, but also at least in two directions of the axes of such a coordinate system. The component of the expansion in the direction of the axis in question of the machine-specific Cartesian coordinate system is dependent upon the angle formed by the swivelled spindle axis with the axes of the coordinate system, and can be calculated using trigonometric functions.

It is also known from this publication that for tool heads and swivel tables, which are rotatable about at least one axis of the machine-specific Cartesian coordinate system, so-called machine parameters are provided to allow for the tool or workpiece displacements caused by these subassemblies and to describe the kinematics of these subassemblies. For example, when an NC block is to be executed, this block usually contains coordinates in a workpiece-specific coordinate system which describe tool-tip movement for machining the workpiece. These coordinates must then be converted by the control system—in conformance with the degrees of freedom of the machine geometry—into motor-driven movements of the machine's subassemblies along the axes of the machine-specific coordinate system, to place the NC tool tip at the position programmed in the NC block. To compensate for temperature, a thermally produced variation in the machine geometry must then be considered. Only after that can the control signals needed for the desired movement be determined for the machine's motors.

The disadvantage of this system is that when working with a five-axis machining, it is necessary to perform trigonometric calculations that entail considerable computing expenditure to compensate for a thermal expansion of the machine geometry, for each interpolation point of a path line.

SUMMARY OF THE INVENTION

The present invention is a method which will enable a simple temperature compensation to be performed for a five-axis machining, without entailing substantial expenditure of computer resources.

In one embodiment, the invention is a method for compensating for temperature-related dimensional deviations in geometry of a machine having a tool for machining a workpiece, comprising the steps of inputting user commands in a first coordinate system, describing coordinates of a desired machine action, compensating the coordinates of the desired machine action for temperature-related dimensional deviations, and converting the compensated coordinates into a second coordinate system to determine control signals for the axle drives of the machine.

The method according to the present invention considers the configuration data that includes a temperature compensation before user input information from the workpiece-specific coordinate system is mapped into the machine-specific coordinate system. In this manner, the temperature compensation takes place prior to the coordinate transformation, which is required to calculate the control signals for the axle drives. According to this method, there is no longer a need to consider thermal influences on the actual position of the tool following the coordinate transformation. By considering thermal influences in the machine geometry using the configuration data, the need is thus eliminated for performing costly trigonometric calculations of the thermal influences on the individual components in the machine-specific coordinate system. In addition, in this manner, for every rotation about the axes of rotation A and/or B, it is no longer necessary to recalculate a temperature compensation at every interpolation step.

BRIEF DESCRIPTION OF THE DRAWINGS

Details pertaining to the present invention and further advantages thereof are described in the following text, with reference to the specific embodiment illustrated in the drawing, whose figures show.

DETAILED DESCRIPTION OF THE INVENTION

The following text describes the application of the method in accordance with the present invention to control a milling machine, whose tool is not only able to be moved in parallel with the orthogonal axes x, y and z of a Cartesian coordinate system, but additionally about axes of rotation A and B, making possible five-axis machining. This rotation can be carried out either by rotating the tool using a swivel head, or alternatively by turning the workpiece using a rotary table or other workpiece support. In both cases, five-axis machining of the workpiece is possible.

Control signals for the axle drives of the five axes of the milling machine are calculated by the control system on the basis of information input by the user in the form of NC records of a program to be executed, or by actuating the directional axis keys which trigger a movement of the machine's subassemblies. At least one drive is assigned to each axis. In the process, the information input by the user is always specified in the context of a workpiece-specific coordinate system, and must be converted into a machine-specific coordinate system by the control system. This conversion is particularly complicated and requires additional computational expenditure when there is a rotation about axes A or B of the tool.

Figure 1:
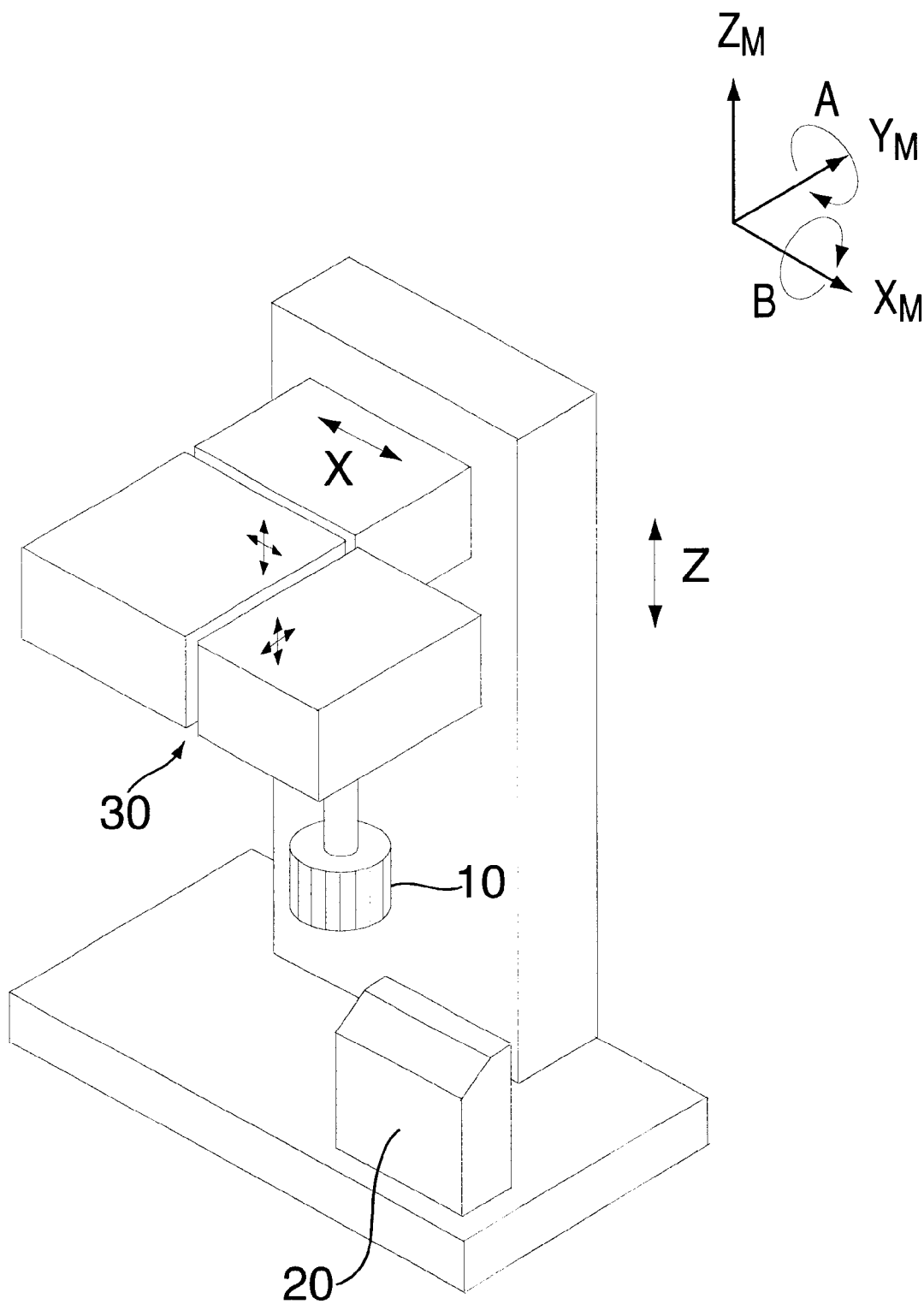
FIG. 1: is a perspective view showing one machine for use in five-axis machining, including a machine-specific coordinate system and a workpiece-specific coordinate system.

As shown in FIG. 1, if one initially considers exclusively a movement of the tool 10 relative to the workpiece 20 in the x-, y- and z-axis, without tilting axes of rotation A and B, a thermally produced expansion of the machine geometry, for example in the x-direction, is compensated by a temperature-dependent offset of the machine parameter for the x-axis. This machine parameter, originally considered in the form of an offset value for the x-, y- and z-coordinates, reflects exclusively the variation in the machine geometry caused by add-on assemblies 30 situated between the drives for the machine axes and the location where the machining tool 10 acts. For example, the add-on assemblies 30 can be different tool heads used on the workpiece. Thus, a machine parameter is no longer a constant value, but becomes a temperature-dependent variable.

According to this system, when calculations are performed the thermal expansion is already considered with the parameters of the machine geometry, and, advantageously, no separate calculation needs to be performed for a motor activation value on the basis of the thermal expansion. Thus, the need is eliminated to make a separate mathematical effort to determine the error produced by the thermal expansion, in addition to the motor activation value originally calculated from the user input information and from the machine parameters.

The dependency of the thermal expansion can be described by any desired function. Preferably, the thermal expansion can be described as a linear or exponential function of the temperature. The recalculation of the thermal expansion is independent of the positional determination and can, for example, be performed on the basis of an ascertained temperature change.

Figure 2:
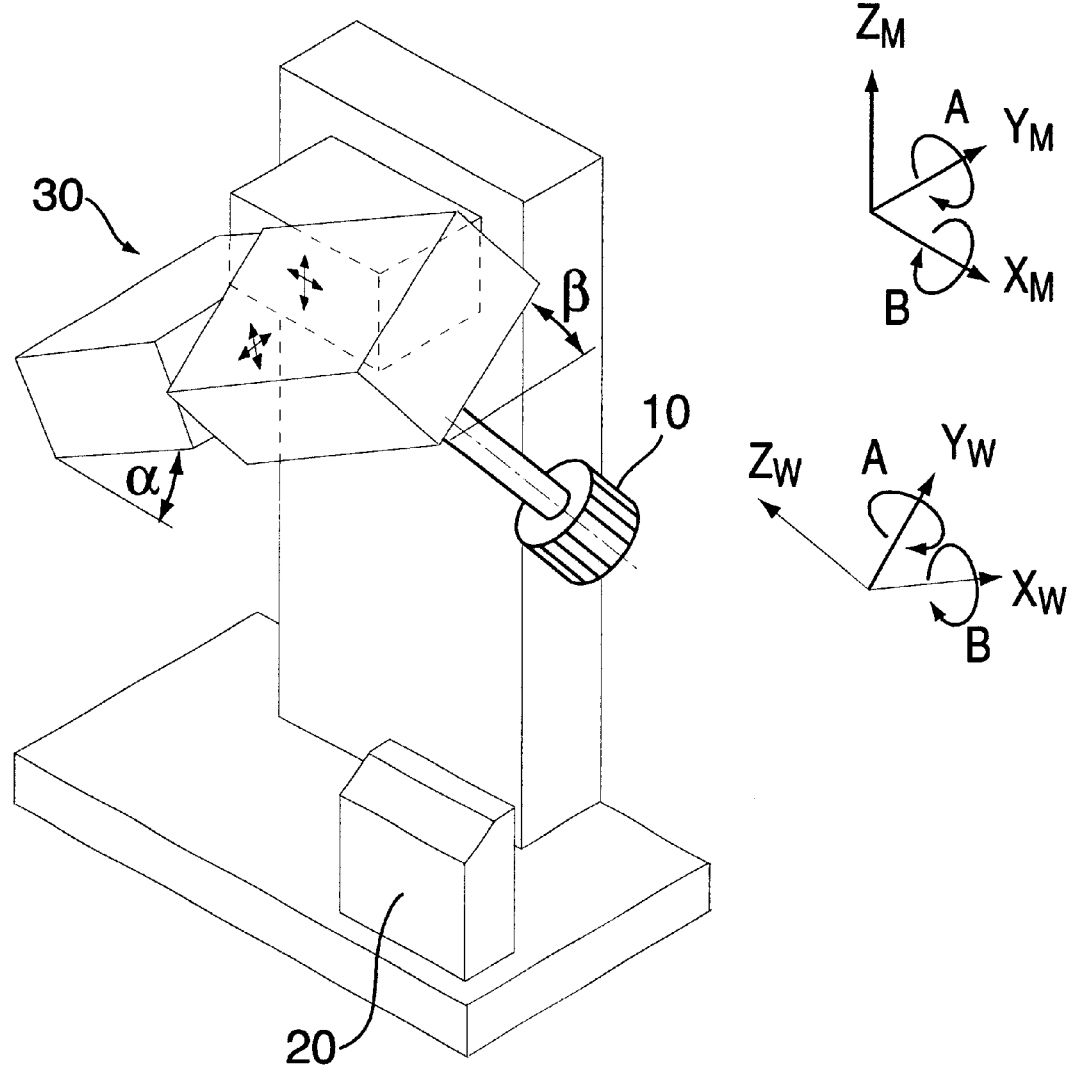
FIG. 2: is a perspective view showing the machine from FIG. 1 including the tool tilted about axes of rotation A and B, for use in five-axis machining.

The procedure according to the invention has important advantages, particularly in the case where the tool rotates about the A and/or B axis, as shown in FIG. 2. In response to the rotation, the user input information in the form of target coordinates in the workpiece-specific coordinate system is converted using a transformation matrix $\underline{A}$ into machine-specific coordinates, to determine the setpoint-value specifications for the axle drives from the setpoint coordinates in the machine-specific coordinate system. The machine-specific coordinate system is different from the workpiece-specific coordinate system because the workpiece-specific coordinate system reflects the rotation about the A and B axes, whereas the machine-specific coordinate system is fixed in space.

The mapping matrix $\underline{A}$ is defined as:

$$\underline{A} = \begin{pmatrix} 1 & 0 & 0 & 0 \\ t_x & r_{11} & r_{12} & r_{13} \\ t_y & r_{21} & r_{22} & r_{23} \\ t_z & r_{31} & r_{32} & r_{33} \end{pmatrix}$$

In this matrix, elements $t_{x,y,z}$ describe the translatory component of the mapping of the workpiece-specific coordinates into a machine-specific coordinate system, and elements $r_{11}$ through $r_{33}$ describe the rotary component of the mapping from the workpiece-specific coordinates into the machine-specific coordinate system. As soon as a rotation takes place about one of axes A or B, elements $r_{11}$ through $r_{33}$ and elements $t_{x,y,z}$ of the mapping matrix $\underline{A}$ are recalculated. However, when a displacement takes place along the axes, only elements $t_{x,y,z}$ need to be recalculated.

Specifically, the target coordinates can be converted from the user input information into control signals for the axle drives in accordance with the present invention. Initially, the machine parameters allow for a description of the machine geometry. For this, the machine parameters, together with the active angular coordinates of the rotary axes, are included when the mapping matrix is formed. Since the machine parameters already contain correction values compensating for thermal expansions, it is no longer necessary to handle these corrections separately.

The vector of the target coordinates is subsequently transformed with the above mapping matrix $\underline{A}$ and, in this manner, the conversion into the machine-specific coordinate system is achieved. For this, the vector for the target point is expanded homogeneously, so that its first coordinate contains a number 1. The resulting vector then contains the already temperature-compensated target coordinates in the machine-specific coordinate system. These machine-specific coordinates are then used to determine the control signals for the axle drives. This ensures that in spite of the tool or of the workpiece being rotated, the axle drives are driven in such a way that the path line input in the workpiece-specific coordinate system is executed as a temperature-compensated path line, requiring only one single transformation with mapping matrix $\underline{A}$.

The values used to compensate for the thermal expansion of the machine subassemblies are considered at an early stage in the computation of the machine parameters, unlike in the known methods where thermal compensation was used exclusively to adapt individual machine-tool designs. In the present method, the values for compensating for thermal expansion are thus included in the calculation, together with the machine parameters used in mapping matrix $\underline{A}$. In this manner, those mathematical operations requiring relatively substantial computational outlay do not need to be performed separately for the temperature compensation step, so that it is not necessary to calculate the temperature compensation separately in the machine-specific coordinate system.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for compensating for temperature-related dimensional deviations in geometry of a machine having a tool for machining a workpiece, comprising the steps of:
   inputting user commands in a first coordinate system, said user commands describing coordinates of a desired machine action;
   compensating the coordinates of the desired machine action for temperature-related dimensional deviations; and
   converting the compensated coordinates into a second coordinate system to determine control signals for the axle drives of the machine.

2. The method as recited in claim 1, further comprising the step of storing in a configuration data of the first coordinate system at least one offset value for translatory and/or rotatory displacements of a machining point where the tool meets the workpiece, caused by one or more variable machine subassemblies, said at least one offset value having a component compensating for the temperature-related dimensional deviations.

3. The method as recited in claim 1, further comprising the preliminary step of inputting the user commands as one of direct control panel inputs which are executed immediately, and NC records which are executed at a later time.

4. The method as recited in claim 2, wherein the configuration data comprise a constant offset value component and an additive temperature-dependent component.

5. The method as recited in claim 1, wherein the first coordinate system is one of a tool-specific and workpiece-specific coordinate system, and wherein the second coordinate system is a machine-specific coordinate system.

6. The method as recited in claim 1, further comprising the step of determining the temperature-related dimensional deviations using one of a linear model and an exponential model for thermal expansion of the machine.

7. The method as recited in claim 1, further comprising the step of recalculating the temperature-related dimensional deviations when a detected temperature changes by a preselected value.

* * * * *

UNITED STATES PATENT AND TRADEMARK OFFICE
CERTIFICATE OF CORRECTION

PATENT NO. : 6,539,274 B1
DATED : March 25, 2003
INVENTOR(S) : Rauth et al.

It is certified that error appears in the above-identified patent and that said Letters Patent is hereby corrected as shown below:

<u>Title page,</u>
Item [73], change "Heidenain" to -- Heidenhain --.

Signed and Sealed this

Nineteenth Day of August, 2003

JAMES E. ROGAN
*Director of the United States Patent and Trademark Office*